(12) United States Patent
Liou et al.

(10) Patent No.: US 7,760,493 B2
(45) Date of Patent: Jul. 20, 2010

(54) FLAT PANEL DISPLAY HAVING A MULTI-FUNCTIONAL SUPPORT

(75) Inventors: Guan-De Liou, Taipei (TW); Stephen Tsai, Taipei County (TW); Shau-Yu Huang, Taipei (TW); Li-Li Lai, Taipei (TW)

(73) Assignee: Hannspree Inc., Taipei (TW)

( * ) Notice: Subject to any disclaimer, the term of this patent is extended or adjusted under 35 U.S.C. 154(b) by 118 days.

(21) Appl. No.: 12/209,973

(22) Filed: Sep. 12, 2008

(65) Prior Publication Data

US 2010/0067184 A1    Mar. 18, 2010

(51) Int. Cl.
*G06F 1/16* (2006.01)

(52) U.S. Cl. .................. 361/679.21; 348/140; 359/619; 248/637; 345/690

(58) Field of Classification Search ............ 361/679.27, 361/679.43, 679.09, 679.26, 679.4, 679.06; 348/837, 140, 744, 836, 569; 359/802, 619, 359/433; 248/276.1, 284.1, 637, 222.11, 248/205.1; 345/173, 1.3, 690, 184
See application file for complete search history.

(56) References Cited

U.S. PATENT DOCUMENTS

| | | | |
|---|---|---|---|
| 2007/0159778 A1* | 7/2007 | Lin et al. | 361/683 |
| 2009/0096941 A1* | 4/2009 | Chen | 348/837 |
| 2009/0231797 A1* | 9/2009 | Kim | 361/679.27 |
| 2009/0257136 A1* | 10/2009 | Liu | 359/802 |

* cited by examiner

*Primary Examiner*—Hung V Duong

(57) ABSTRACT

The flat panel display (FPD) comprises a body, a central pivoting segment and two supports. The body has a screen, and the central pivoting segment is mounted through one side of the body. The supports are attached pivotally to the central pivoting segment and are opposite to each other. Each support is L-shaped and has a first leaf, a second leaf and a joint. The first leaf is mounted pivotally on the central pivoting segment. The joint is mounted between second connecting ends of the first and second leaves. The supports not only allow the viewing angle of the screen to be adjusted but also allow the body to be aligned with the supports to facilitate carrying and storing.

11 Claims, 8 Drawing Sheets

US 7,760,493 B2

FLAT PANEL DISPLAY HAVING A MULTI-FUNCTIONAL SUPPORT

BACKGROUND OF THE INVENTION

1. Field of the Invention

The present invention relates to a flat panel display having a support, especially relates to a flat panel display having a multi-functional support that may be adjusted to various viewing angles and may be hung on a vertical partition.

2. Description of the Prior Arts

With the manufacturing technology of flat panel display (FPD) and the mass production of liquid crystal displays (LCDs), LCDs are widely used and are becoming the main stream FPD. LCDs have predetermined ranges of visible angles and an optimum viewing angle. Therefore, LCDs require LCD supports that allow adjustment to various viewing angles for performance improvement.

Since multiple electronic devices are not easy to carry, all-in-one multi-functional electronic devices are being developed. Therefore, different functions require different modes of operation.

Furthermore, as the size of electronic devices is getting smaller, thinner and lighter, FPDs supports are developed with the same concern.

To overcome the shortcomings, the present invention provides an FPD having a multi-functional support to mitigate or obviate the aforementioned problems.

SUMMARY OF THE INVENTION

The main objective of the present invention is to provide a flat panel display (FPD) having a multi-functional support. The FPD comprises a body, a central pivoting segment and two supports. The body includes a screen. The central pivoting segment is mounted through one side of the body. The supports are attached pivotally to the central pivoting segment and are opposite to each other. Each support is L-shaped and has a first leaf, a second leaf and a joint. The first leaf is mounted pivotally on the central pivoting segment. The joint is mounted between connecting ends of the first and the second leaves. The supports not only allow the viewing angle of the screen to be adjusted but also allow the body to be aligned with the supports to facilitate carrying and storing. Other objectives, advantages and novel features of the invention will become more apparent from the following detailed description when taken in conjunction with the accompanying drawings.

DETAILED DESCRIPTION OF THE PREFERRED EMBODIMENTS

Figure 1:
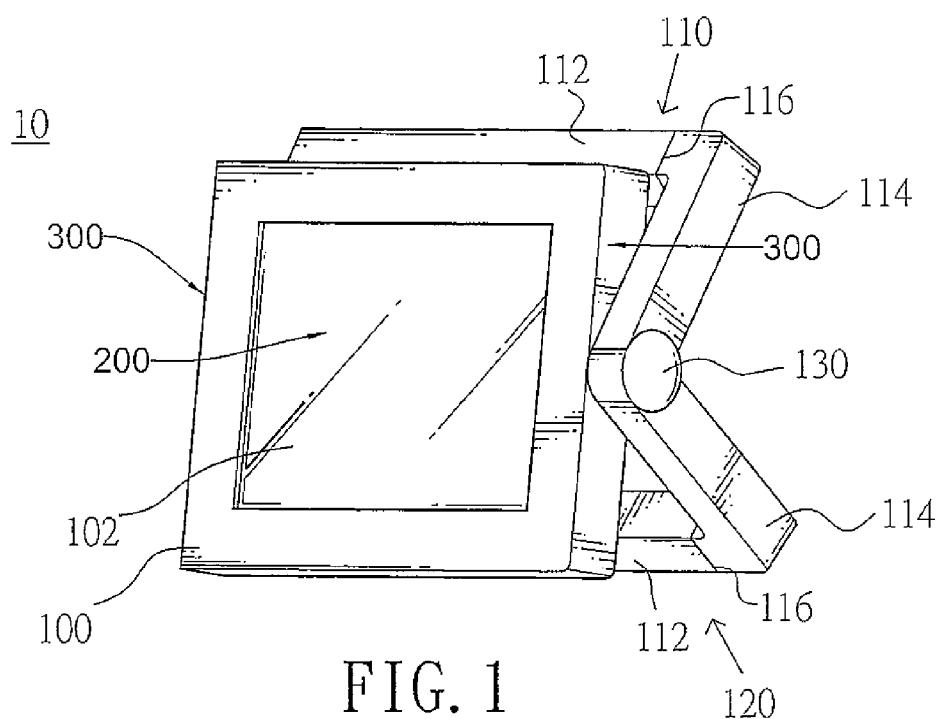
FIG. 1 is a perspective view of a first embodiment of a flat panel display (FPD) having a multi-functional support in accordance with the present invention.
Figure 2:
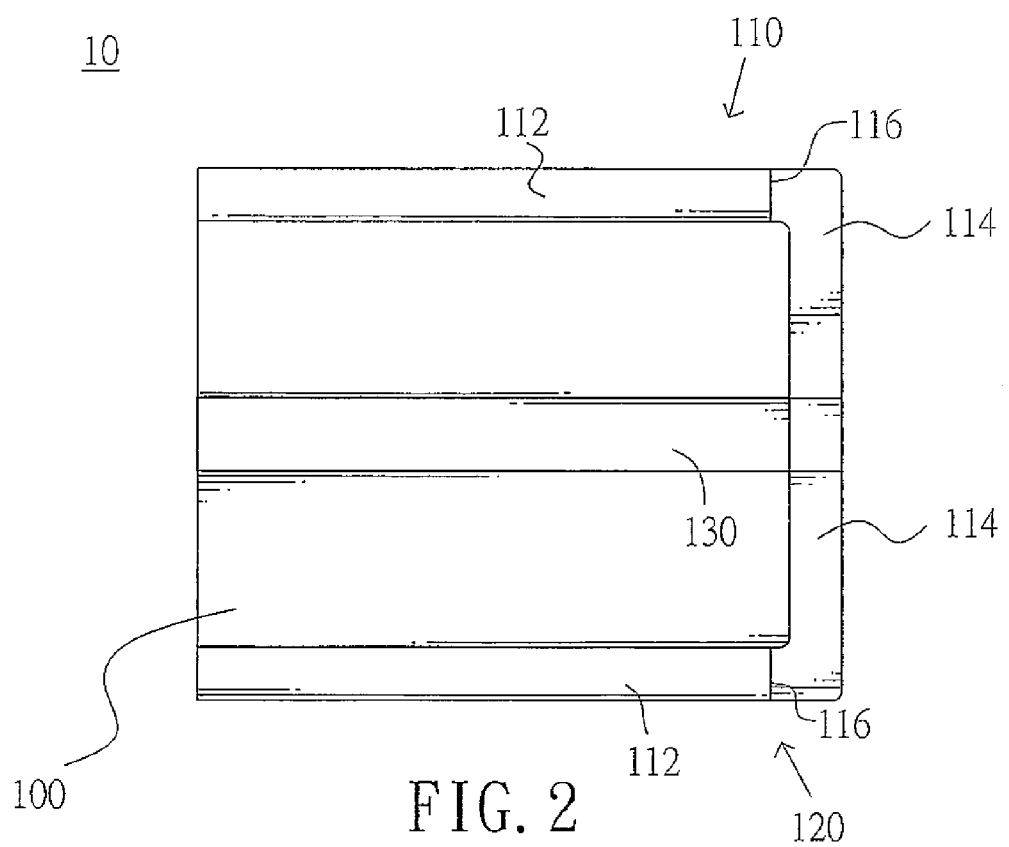
FIG. 2 is a rear view of the FPD in FIG. 1.

With reference FIGS. 1 and 2, a flat panel display (FPD) (10) having multi-functional supports in accordance with the present invention comprises a body (100), a central pivoting segment (130), a first support (110) and a second support (120).

The body (100) has a front surface (200), two sides (300) and a screen (102). The screen (102) is formed in the front surface.

The central pivoting segment (130) is mounted through one of the sides (300) of the body (10).

The first and second supports (110, 120) are pivotally attached to the central pivoting segment (130) and are opposite to each other. Each support (110, 120) is L-shaped and has a first leaf (114), a second leaf (112) and a joint (116). The first leaf (114) is mounted pivotally on the central pivoting segment (130) and has a first connecting end. The second leaf (112) is substantially perpendicularly connected to the first leaf (114) and has a second connecting end. The joint (116) is mounted between the connecting ends of the first and second leaves (114, 112).

With reference to FIGS. 1, 4, 5, 6, 9, 10 and 11, the joint (116) may be a fastening structure such as adhesive, rivets, or the like, to mount the connecting ends of the first and the second leaves (114, 112) securely.

With reference to FIGS. 7, 8, 12 and 13, the joint (116) may be a pivoting structure such as a pivoting pin (117) to mount the connecting ends of the first and the second leaves (114, 112) pivotally. Therefore, the second leaf (112) may be pivoted to remain horizontal to easily place adornments (180) such as toys or decorations and also allow stable placement of the multi-functional supports on flat surfaces.

With reference to FIGS. 4, 9, 13 and 14, the FPD as described may have multiple universal serial bus (USB) ports (150). The USB ports (150) are formed in the first leaf (114) of one of the first or second supports (110, 120) and are electrically connected to the body (100).

With reference to FIGS. 5, 10, 13 and 14, the FPD as described may have at least one speaker (160). The speaker (160) is formed in the first leaf (114) of one of the first or second supports (110, 120) and is electrically connected to the body (100).

Figure 6:
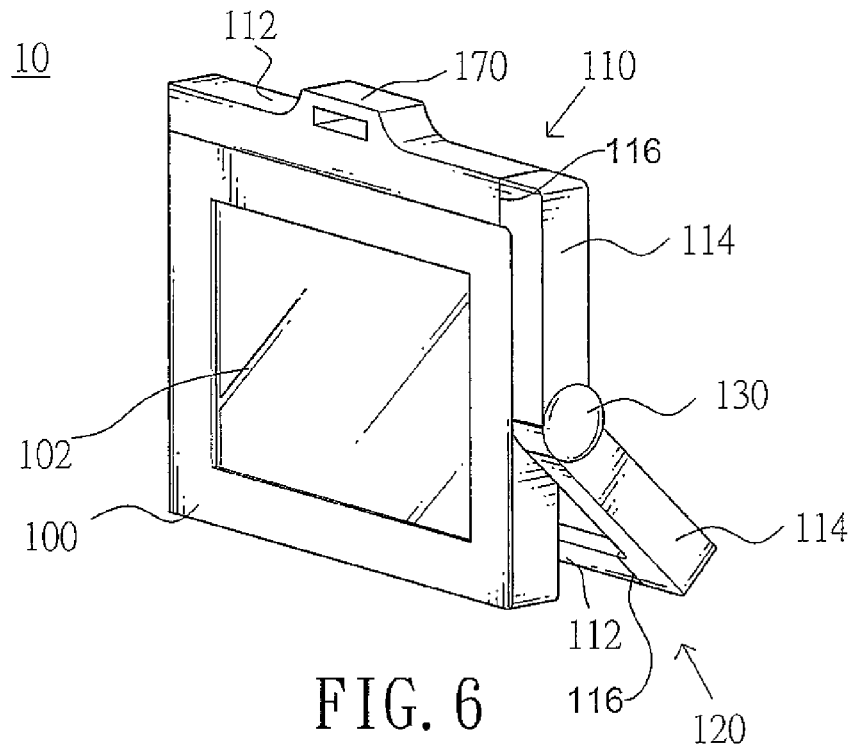
FIG. 6 is a perspective view of a fourth embodiment of an FPD having a multi-functional support in accordance with the present invention.
Figure 7:
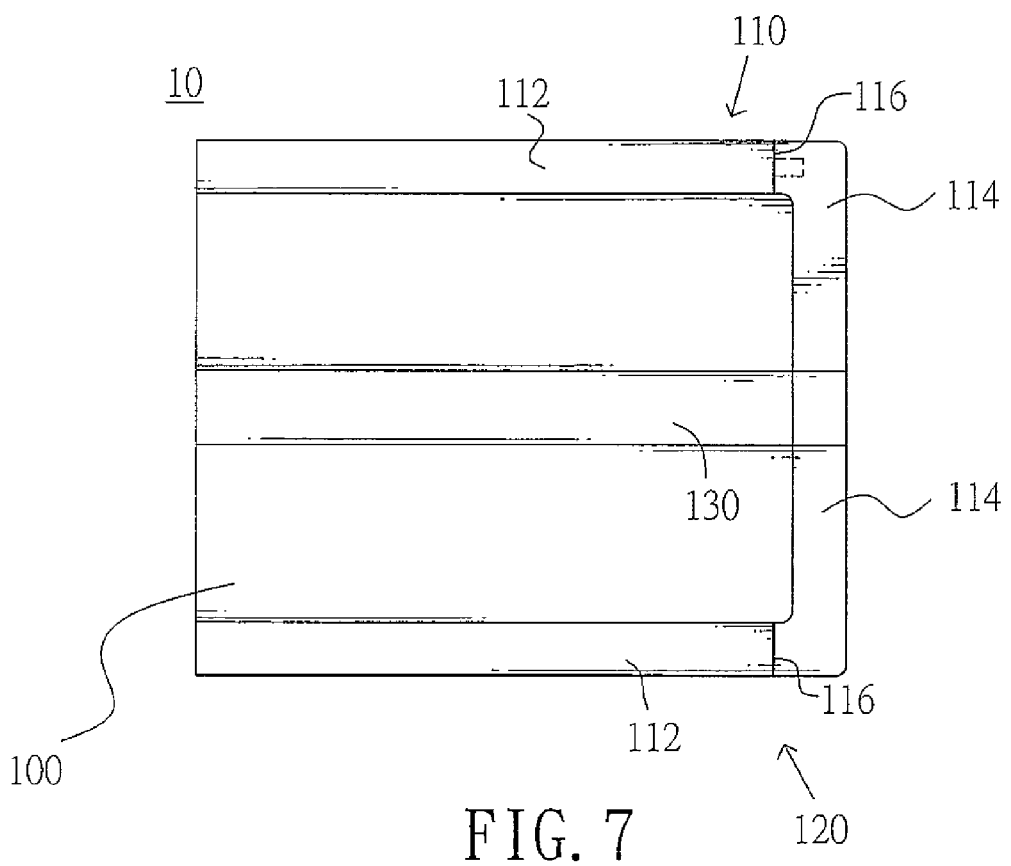
FIG. 7 is a rear view of a fifth embodiment of an FPD having a multi-functional support in accordance with the present invention.
Figure 8:
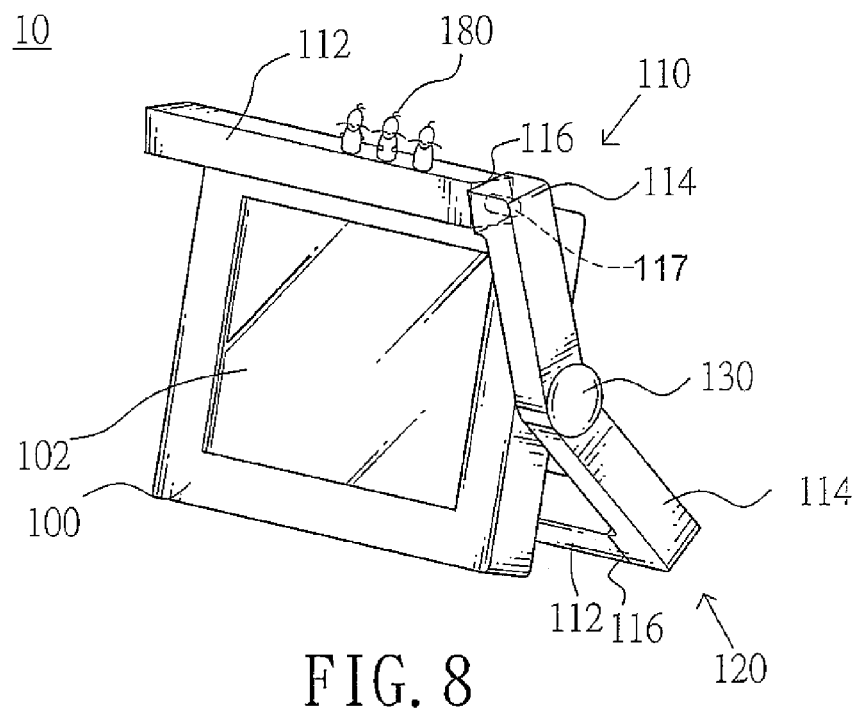
FIG. 8 is an operational perspective view of the FPD having a multi-functional support in FIG. 7.
Figure 9:
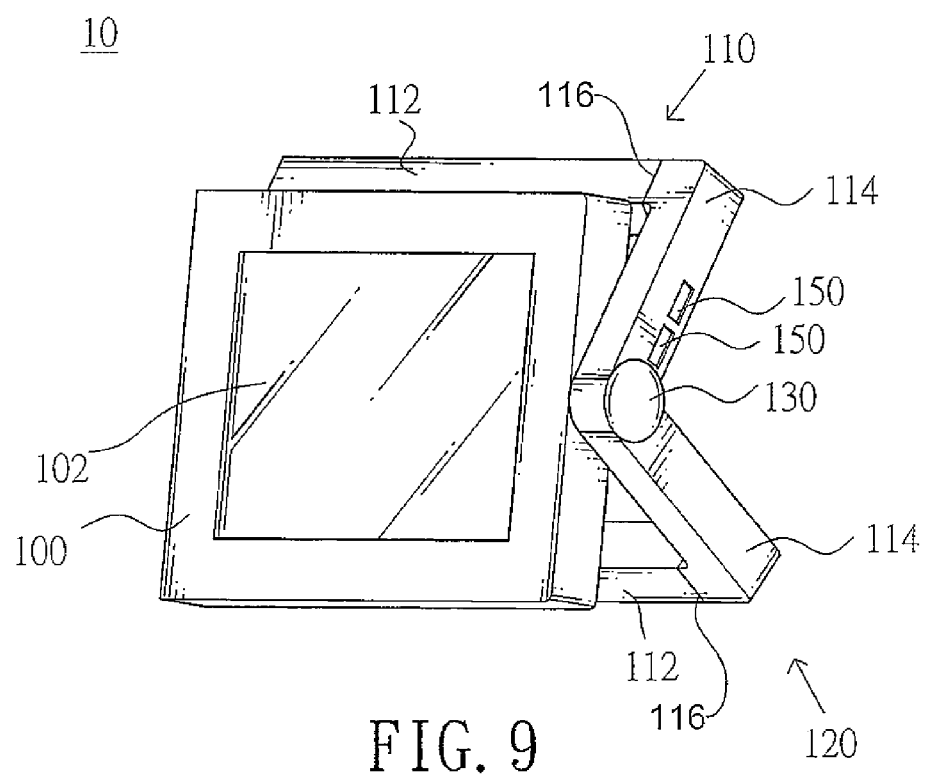
FIG. 9 is a perspective view of a sixth embodiment of an FPD having a multi-functional support in accordance with the present invention.
Figure 10:
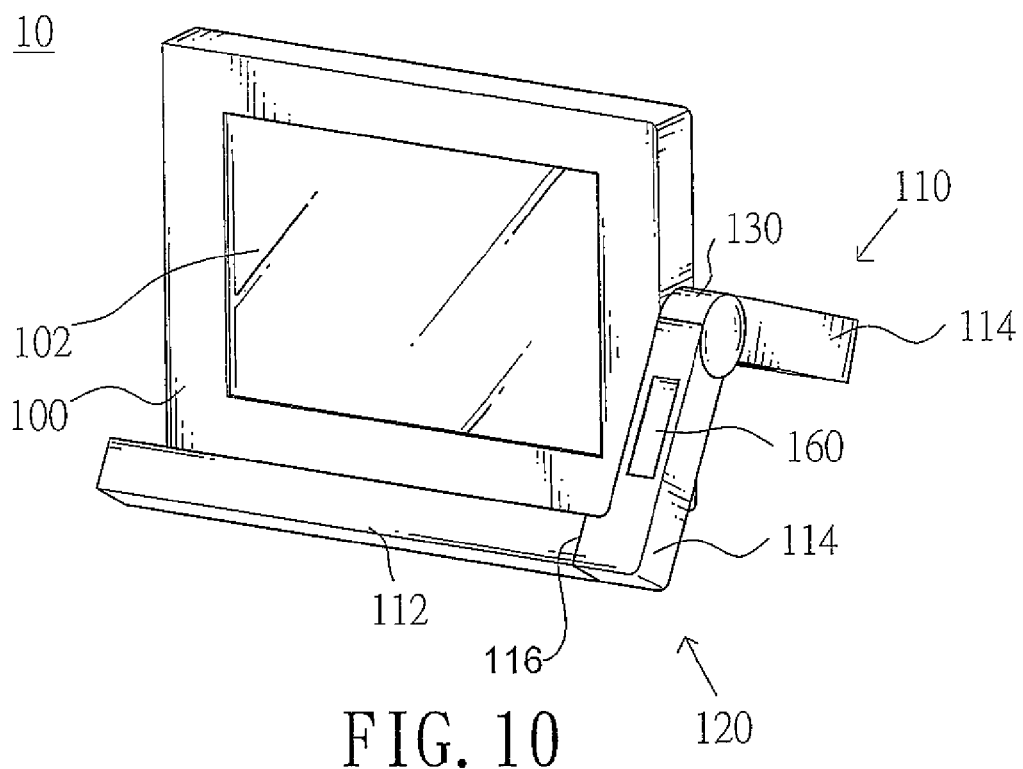
FIG. 10 is a perspective view of a seventh embodiment of an FPD having a multi-functional support in accordance with the present invention.
Figure 11:
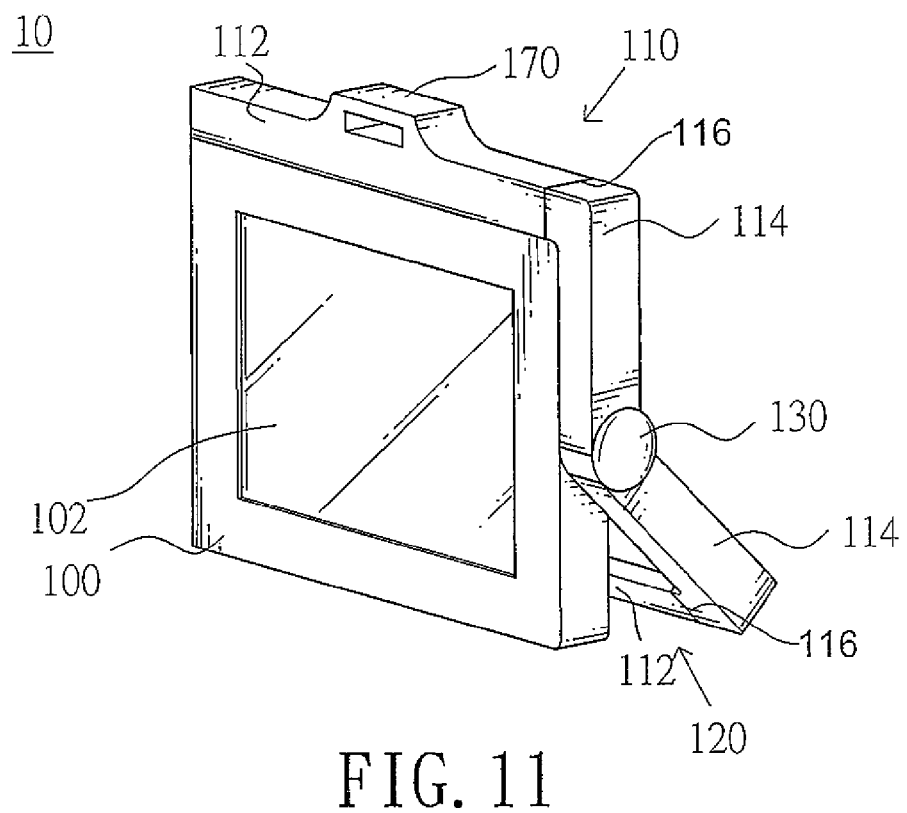
FIG. 11 is a perspective view of an eighth embodiment of an FPD having a multi-functional support in accordance with the present invention.
Figure 13:
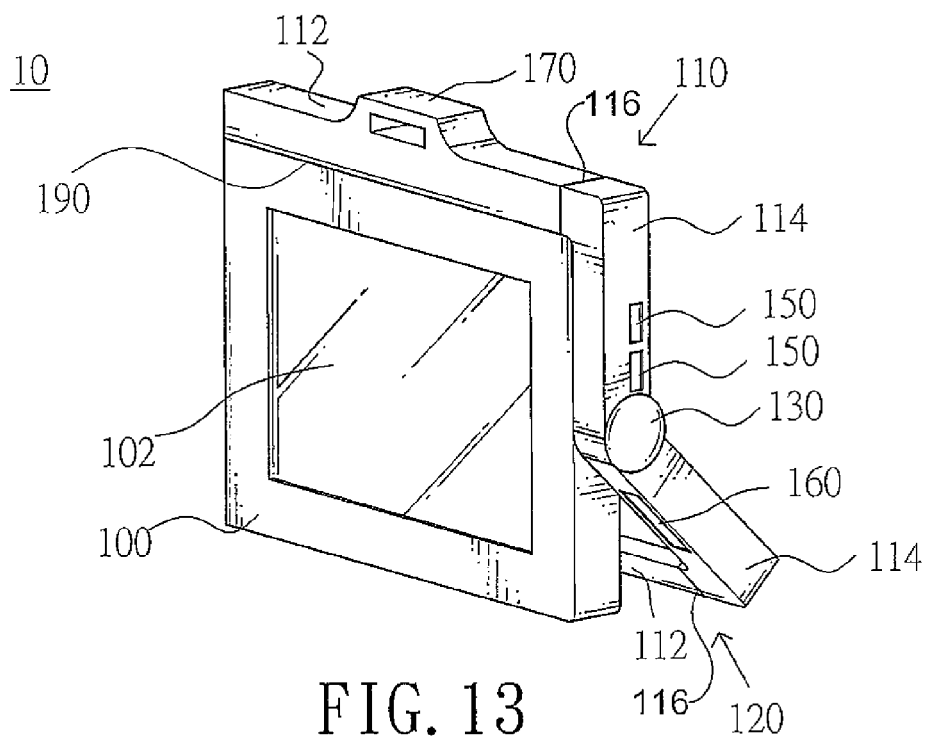
FIG. 13 is a perspective view of a tenth embodiment of an FPD having a multi-functional support in accordance with the present invention.
Figure 14:
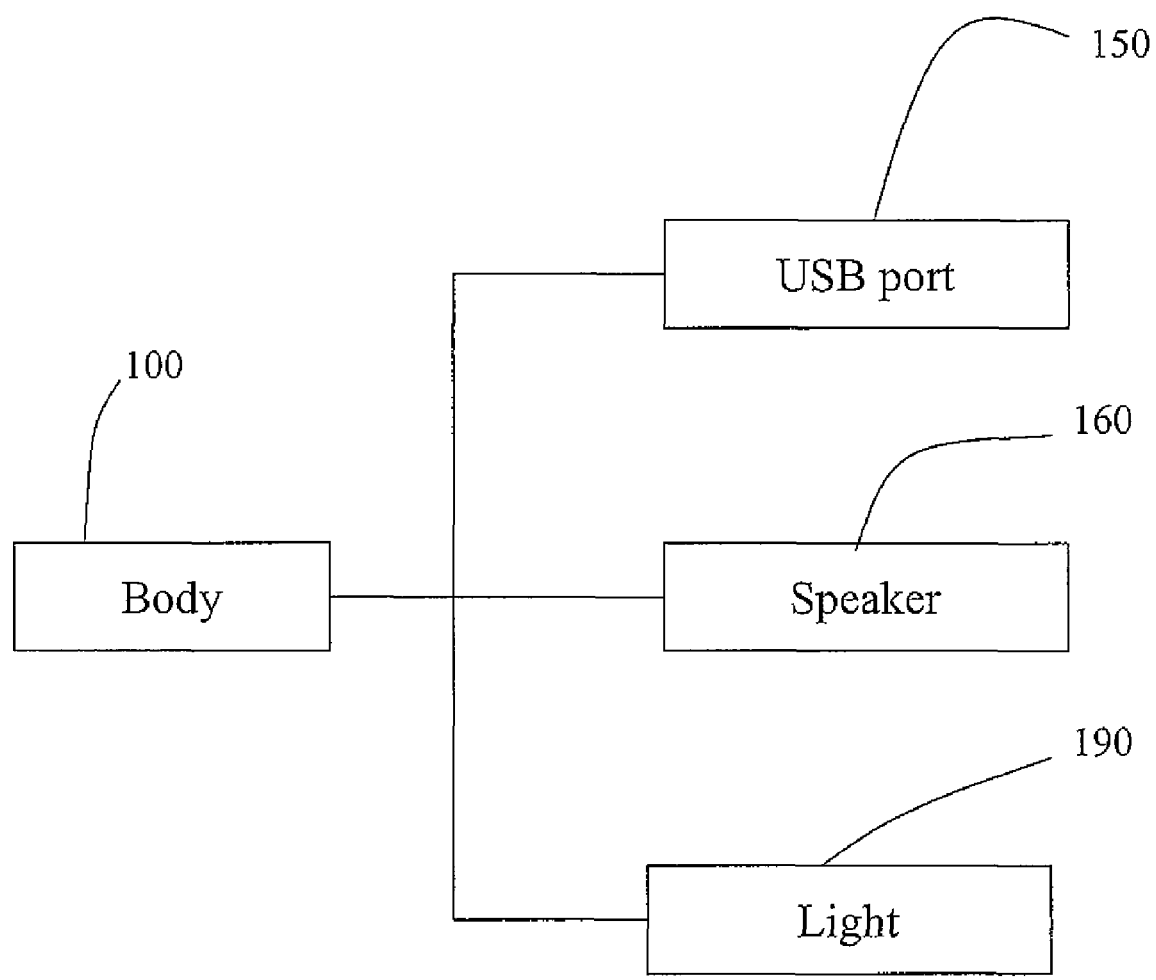
FIG. 14 is a functional block diagram of the FPD in FIGS. 4, 5, 9, 10 and 13.

With reference to FIGS. 6, 11 and 13, the FPD as described may have a handle (170). The handle (170) is formed on the second leaf (112) of one of the first or second supports (110, 120). Therefore, the FPD as described is easily carried by the handle (170).

Figure 12:
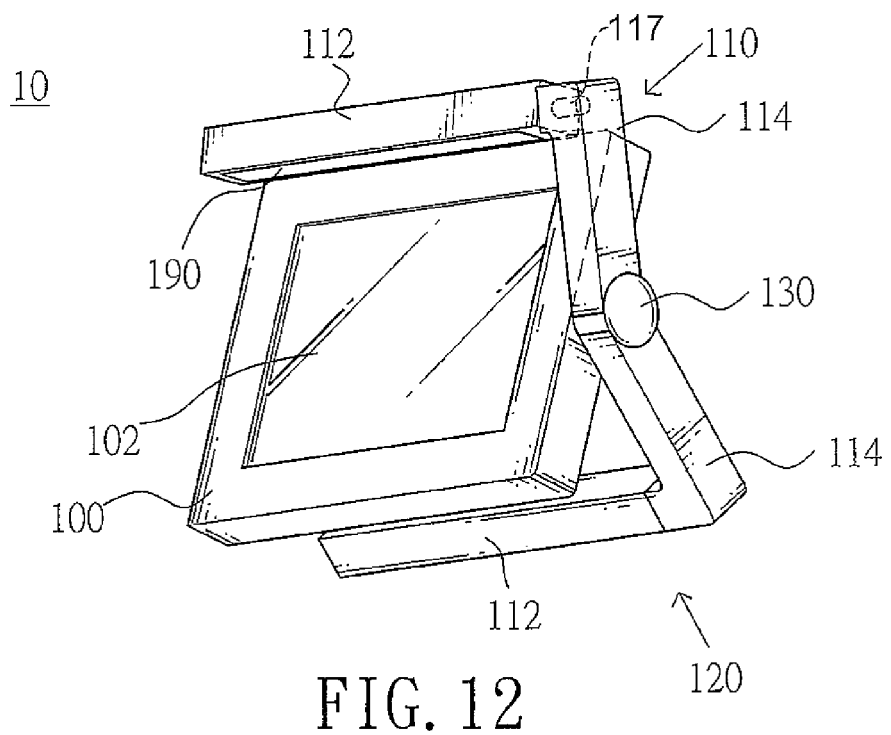
FIG. 12 is a perspective view of a ninth embodiment of an FPD having a multi-functional support in accordance with the present invention.

With reference to FIG. 12, the FPD as described may have a light (190). The light (190) may be a light emitting diode (LED), light bulb, etc. and is mounted in the second leaf (112) or is mounted in the first leaf (114) of one of the first or second supports (110, 120) to provide illumination.

In conclusion, the FPD as described has the following advantages:

1. With the arrangement of the supports (110, 120) and the central pivoting segment (130), the supports (110, 120) are pivoted not only to adjust the viewing angle of the screen (102) but also to selectively align with the body (100) to facilitate storage. Therefore, the FPD as described is easily stored and transported.

2. Because of the additional structures like the USB ports (150), the speaker (160) and the light (190), the FPD as described has multiple functions besides being merely a panel display.

3. The FPD as described is easily carried by the handle (170).

4. Through the pivoting structures of the joint (116), the second leaf (112) is pivoted relative to the first leaf (114) to remain horizontal or to adjust an appropriate illumination angle of the light (190).

Figure 3:
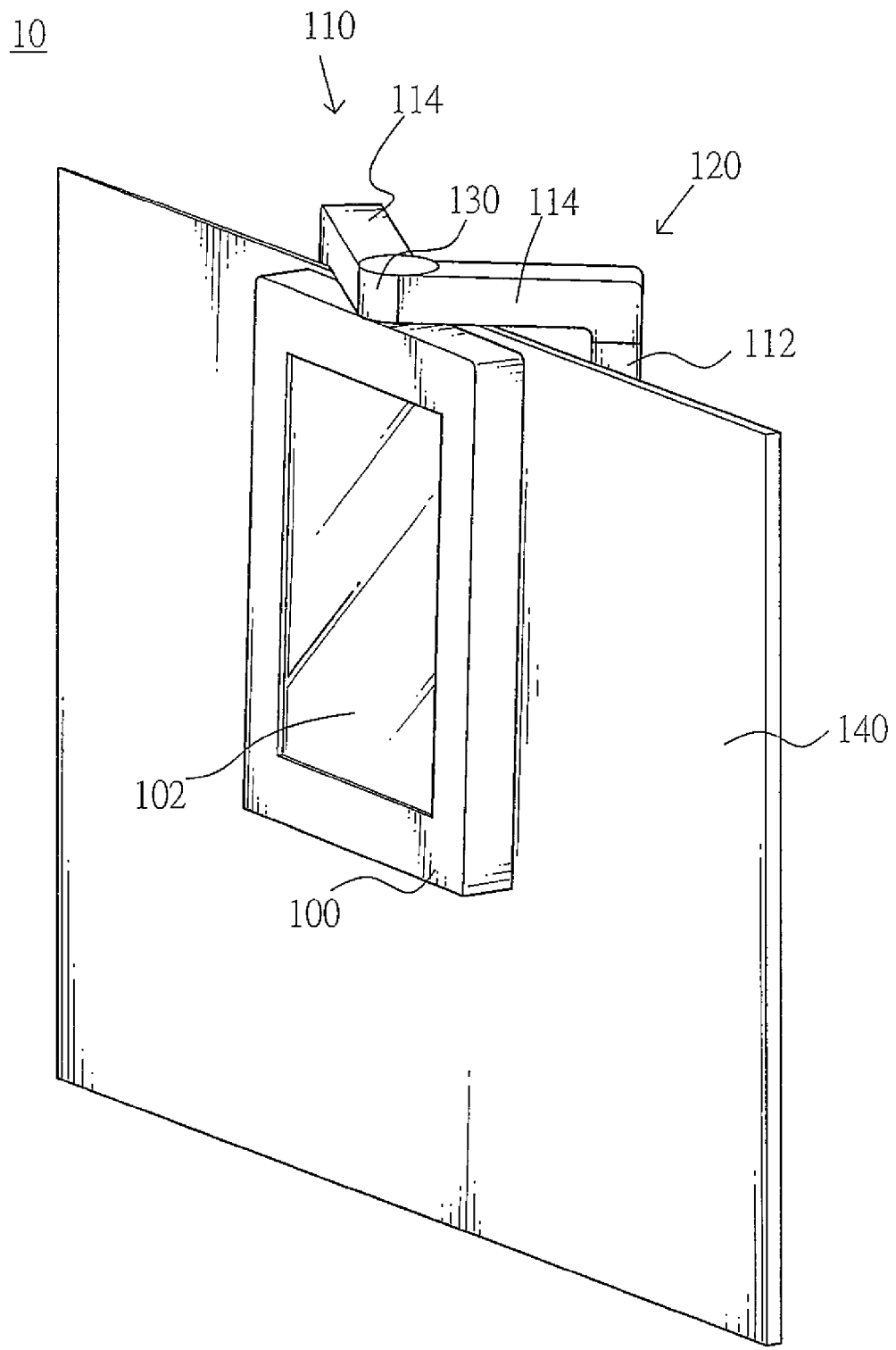
FIG. 3 is an operational view of the FPD in FIG. 1, showing the FPD hung on a vertical partition.
Figure 4:
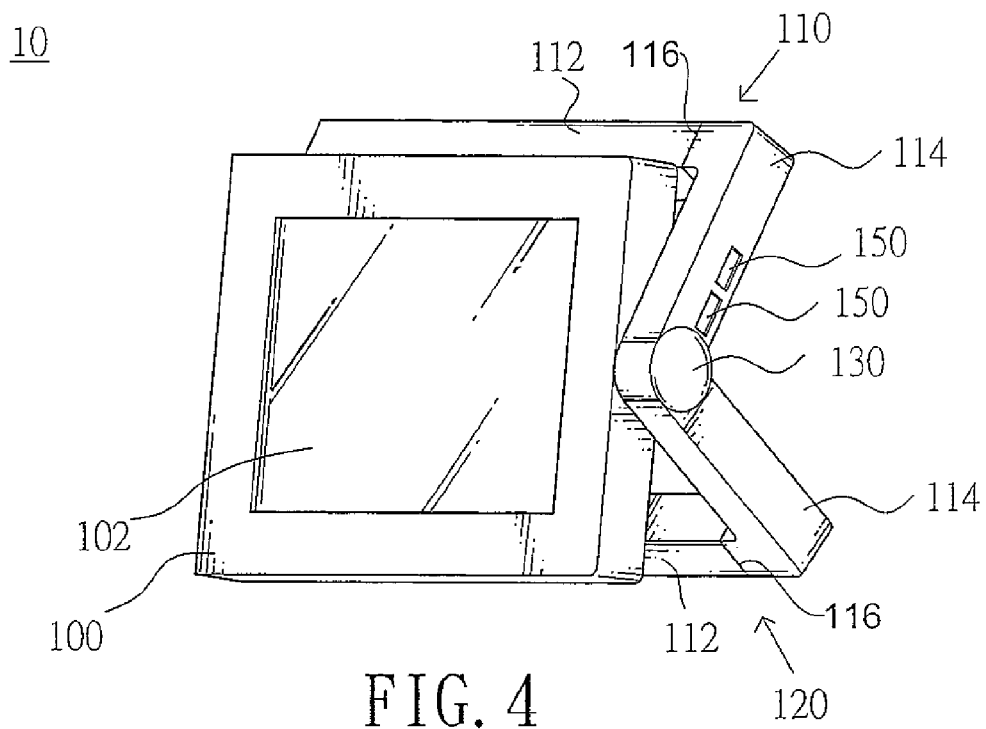
FIG. 4 is a perspective view of a second embodiment of an FPD having a multi-functional support in accordance with the present invention.
Figure 5:
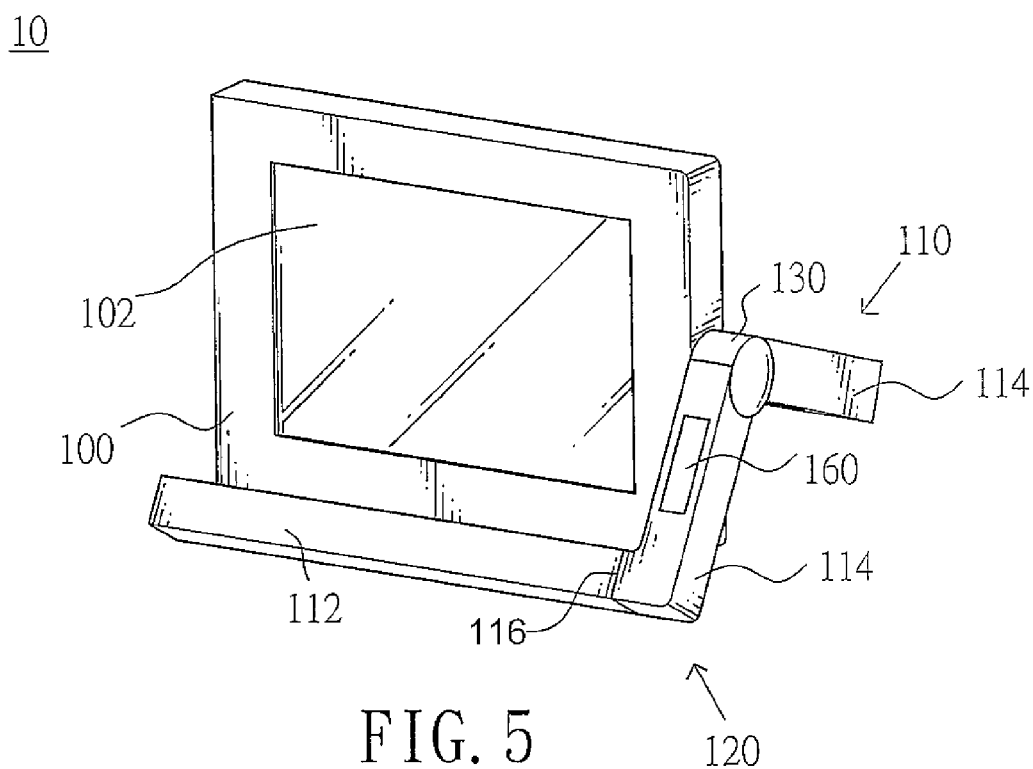
FIG. 5 is a perspective view of a third embodiment of an FPD having a multi-functional support in accordance with the present invention.

5. With reference to FIG. 3, with the arrangement of the supports (110, 120) and the central pivoting segment (130), the FPD as described can be hung on a vertical partition (140).

What is claimed is:

1. A flat panel display comprising:
    a body having
        a front surface;
        two sides; and
        a screen being formed in the front surface;
    a central pivoting segment being mounted through one of the sides of the body; and
    two supports being pivotally attached to the central pivoting segment and being opposite to each other, and each support being L-shaped and having
        a first leaf being mounted pivotally on the central pivoting segment and having a first connecting end;
        a second leaf being connected to the first leaf and having a second connecting end; and
        a joint being mounted between the connecting ends of the first and second leaves.

2. The flat panel display as claimed in claim 1, wherein the joint is a fastening structure to mount the connecting ends of the first and second leaves securely.

3. The flat panel display as claimed in claim 1, wherein the joint is a pivoting structure to mount the connecting ends of the first and second leaves pivotally.

4. The flat panel display as claimed in claim 1 further comprising a handle being formed on the second leaf of one of the supports.

5. The flat panel display as claimed in claim 1 further comprising multiple universal serial bus ports being formed in the first leaf of one of the supports.

6. The flat panel display as claimed in claim 1 further comprising at least one speaker being formed in the first leaf of one of the supports.

7. The flat panel display as claimed in claim 1 further comprising a light being mounted in the second leaf of one of the supports.

8. The flat panel display as claimed in claim 3 further comprising a light being mounted in the second leaf of one of the supports.

9. The flat panel display as claimed in claim 7, wherein the light is a light emitting diode (LED).

10. The flat panel display as claimed in claim 8, wherein the light is a light emitting diode (LED).

11. The flat panel display as claimed in claim 8 further comprising
    a handle being formed on the second leaf of one of the supports;
    multiple universal serial bus (USB) ports being formed in the first leaf of one of the supports; and
    at least one speaker being formed in the first leaf of one of the supports.

* * * * *